3,198,779
PROCESS OF PRODUCING LOW MOLECULAR WEIGHT HYDROCARBON RESINS

Raymond J. Kray, Berkeley Heights, and Julius P. Rakus, Mount Freedom, N.J., assignors to Allied Chemical Corporation, New York, N.Y., a corporation of New York
No Drawing. Filed Nov. 15, 1961, Ser. No. 152,664
5 Claims. (Cl. 260—93.7)

This invention relates to the preparation of synthetic low molecular weight hydrocarbon resins including resins useful as wax substitutes.

Polyethylene and polypropylene low molecular weight polymers, including resins which are useful as wax substitutes, are known. Polyethylene resins, useful as wax substitutes, have found wide industrial applications in fields requiring hard, high-melting coatings.

It is among the objects of the present invention to provide a process of producing low molecular weight hydrocarbon resins, including resins useful as wax substitutes, which resins possess a combination of desirable physical properties not previously available in heretofore known resins, including the heretofore known polyethylene and polypropylene resins.

Another object of this invention is to provide a method of thermally decomposing polybutene-1 to produce resins, useful as wax substitutes, of good hardness, which retain the high melting point characteristics of polybutene-1 moulding polymers.

Other objects and advantages of this invention will be apparent from the following detailed description thereof.

Crystalline polybutene-1 is defined as a polybutene-1 having chains which are stereoregular in structure and exhibit an essentially linear structure in which the pendant ethyl groups are fixed by the polymerization method in a regular stereochemical manner with respect to each other. Such ordered polymeric polyolefins have been described by G. Natta (see G. Natta, Journal of Polymer Science, 16, 143, 1955). Natta discloses that such stereoregulated polyolefins, in contrast to those with a random orientation of pendant ethyl groups, exhibit high crystallinity, are insoluble in common solvents such as diethyl ether and are only slightly soluble in hydrocarbon solvents such as heptane when of sufficiently high molecular weight, i.e. greater than 50,000. Various stereochemical conformation of ethyl groups along the polymer chain are known and referred to by those versed in the art as isotactic, stereosymmetric, and syndiotactic.

The polybutenes employed as the starting material in the practice of the process of this invention can be any of the polybutenes heretofore known exhibiting high crystallinity including so-called isotactic, stereosymmetric and syndiotactic materials.

In this specification, the expression "isotactic" means the material in a polybutene polymer remaining after extraction with diethyl ether. The diethyl ether extraction removes the atactic material and leaves a polymer containing the isotactic material.

Parts and percentages are given herein on a weight basis. Molecular weights given were determined by solution-viscosity measurements (see R. Chiang, Journal Polymer Science, 28, 235, 1958). Hardness was determinde by the method of ASTM procedure D 1321. Softening points were determined by ASTM procedure E 28–51 T, and are expressed in degrees centigrade. Melting points were determined on a Nagle melting point apparatus, with polaroid insert and 25× magnification and are expressed in degrees centigrade.

The present invention provides new synthetic polybutene resins, including resins useful as wax substitutes, which resins are characterized by being high-melting and extremely hard, and having low molecular weights, i.e., from 3,000 to 45,000, and good solubility in hydrocarbon solvents such as heptane, octane and decahydronaphthalene. The polybutene resins of this invention, while retaining the crystallinity and stereoregulated structure of previously known butene-1 polymers, have an appreciably lower molecular weight and surprisingly better solubility in hydrocarbon solvents such as those above mentioned.

The polybutene-1 resins produced by the process of this invention have a molecular weight of 3,000 to 45,000, preferably 7,000 to 25,000, a hardness between 0.0 and 3.0, a softening point between 100° and 140° and melting points between 105° and 130°. Unlike polyethylene and polypropylene resins, including wax substitutes, these polybutene resins are compatible with paraffin waxes in all proportions. Furthermore, they have the same unexpectedly low viscosity characteristics of polypropylene resins useful as wax substitutes, but have the additional advantage of having a melting point low enough to enable them to be used in conventional coating equipment. The polyethylene resins by way of comparison do not have the hardness or the high softening point of the polybutene resins of this invention. The polybutene resins produced by the process of this invention, as noted, have good solubility in hydrocarbon solvents such as heptane, octane and decahydronaphthalene. The use of these resins in the production of coatings results in superior flexible coatings which will not crack upon flexing of the substrate to which the coating is applied.

The process of this invention involves the thermal cracking of polybutenes of at least 50,000 molecular weight and having an isotactic content of at least 10%, preferably at least 80%. Such polybutene starting materials can be prepared, as is well known, by polymerizing butene-1, using a Ziegler type catalyst and conducting the polymerization in the presence of an organic solvent or the liquid monomer as the solvent medium or in the vapor phase. Any of the known Ziegler type catalysts can be used; for example, catalysts obtained by reaction between compounds of metals of Groups IV–A (titanium, zirconium, hafnium or thorium), V–A (vanadium, columbium, or tantalum) or VI–A (chromium, molybdenum, tungsten, or uranium) with alkyl compounds of aluminum or a metal of Group II (beryllium, magnesium, calcium, strontium, barium, zinc or cadmium). Polybutene produced by polymerization of butene-1 using stereospecific catalysts such as $CrO_3$ on an $SiO_2$–$Al_2O_3$ support or a catalyst consisting of a promoted $MoO_3$ can also be used. As any polybutene polymer having an isotactic content of at least 10% and a molecular weight of at least 50,000 can be used as the starting material, further description of such polybutenes is believed unnecessary except to note that the yield of polybutene-1 resin of this invention is directly proportional to the crystallinity of the polybutene starting material subjected to thermal cracking by the process described herein.

Starting with a polybutene having an isotactic content in excess of 80%, preferably in excess of 90%, the polybutene can be processed directly, as hereinafter described. In the case of polybutenes having isotactic contents below 80% by weight, they are preferably first extracted with a suitable solvent such as diethyl ether to increase the isotactic content to above about 80% before thermal cracking, as hereinafter described. Alternatively, in the processing of polybutenes having relatively low isotactic contents, say below about 80%, the polybutene may be thermally cracked, as hereinafter described, and the cracked product subjected to extraction with a suitable solvent such as diethyl ether, to remove the atactic material and recover the desired resin as residual product. This latter procedure does not give as good yields as the alternative procedure involving extraction of the polybutene to produce a polybutene starting material having an isotactic content of at least 80%, which is subjected to thermal cracking. Moreover, the procedure involving solvent extraction of the thermally cracked product is time-consuming and tedious. Hence it is preferred to start with a polybutene having an isotactic content in excess of 80%, although, as indicated, the invention is not limited to so doing.

In accordance with this invention, polybutene having a molecular weight of at least 50,000 and an isotactic content of at least 10% is heated to a temperature of from 250° to 450° under a pressure of from 0.001 to 25 mm., preferably from 0.001 to 10 mm. of mercury in a non-oxidizing atmosphere until the molecular weight is lowered to at least 45,000 and preferably to between 7,000 to 25,000. In general, heating under these conditions for from 5 minutes to about 24 hours will suffice to produce the desired resin product. Pressures above 25 mm. of mercury should be avoided because thermal cracking under such pressure conditions results in inferior products not having the hardness or high softening points of the resins of this invention. It is indeed surprising and unexpected that by carrying out the thermal cracking of a polybutene having a molecular weight in excess of 50,000 and an isotactic content of at least 10% under the temperature and pressure conditions specified, a resin having the relatively low average molecular weights of from 3,000 to 45,000, preferably from 7,000 to 25,000, is obtained of exceptionally high hardness and high softening points. The explanation for this unexpected result is not known at this time.

Thermal decomposition of the polybutene can be effected batchwise or continuously, using, of course, a closed reactor which is maintained under a vacuum of from 0.001 to 25 mm. of mercury, and maintaining the polybutene under a non-oxidizing atmosphere at a temperature of from 250° to 450°. Thus, for example, a polybutene having a molecular weight of at least 50,000 can be introduced into a reactor containing an inert atmosphere, and equipped with a stirrer, the reactor evacuated and while maintaining the temperature therein within the range of from 250° to 450°, by heating the reactor, permitting the thermal cracking to proceed for the desired time interval. It is preferred to introduce an inert gas such as argon or nitrogen to displace all air oxygen in the reactor before the contents of the reactor are heated in order to avoid oxidation and discoloration of the product. Thereafter the vacuum is applied to the reactor and the thermal cracking proceeds for the desired time interval and under the above disclosed temperature and pressure conditions to produce the product.

Thermal cracking may be effected continuously by introducing a stream of molten polybutene at one end of an evacuated reaction zone maintained at a temperature within the range of from 250° to 450° and in which a non-oxidizing atmosphere is also maintained by taking the necessary precautions to prevent the entry of air thereinto, and continuously withdrawing from the other end of the reaction zone the product at a rate such that the residence time of the polybutene is sufficiently long for molecular weight degradation to the extent necessary to produce the resins of this invention.

The following examples are given to illustrate the invention. It will be appreciated that the invention is not limited to these examples. These examples are carried out in a reactor of one liter capacity, equipped with a thermometer, a gas inlet and outlet tube, a stainless steel stirrer and a heater for heating the reactor. After introduction of the charge in each case, the reactor was evacuated, nitrogen introduced, again evacuated and the introduction of nitrogen and subsequent evacuation repeated three times, thus insuring the presence of a non-oxidizing atmosphere during the thermal cracking of the charge. Upon completion of the thermal cracking for the given time interval, the contents of the reactor were cooled to room temperature and analyzed. All yields given are based on the weight of polybutene charged to the reactor.

Example 1

Polybutene, 293 g., having a molecular weight of 295,000 and an isotactic content of 100%, was thermally cracked at a temperature of 350° under a pressure of 1.5 to 4.5 mm. of mercury for four hours. A resin product was thus obtained in 88% yield. It had a molecular weight of 7,200, a melting range of 112–115°, a softening point of 116° and a hardness of 2.0.

For comparative purposes, 300 grams of polybutene, having a molecular weight of 415,000 and an isotactic content of 94%, was heated at a temperature of 350° for 3¼ hours, in an atmosphere of nitrogen, at a pressure of 760 mm. of mercury. 83% resin was obtained, which resin had a molecular weight of 10,700, a melting range of 86° to 90°, a softening point of about 101° and a hardness of 14.5.

The marked differences between the molecular weight, the melting range and hardness of the resin of Example 1 and the corresponding properties of the resin obtained in the comparative run carried out at atmospheric pressure is indeed surprising and unexpected.

Example 2

Polybutene, 296 g., having a molecular weight of 370,000 and an isotactic content of 100% was thermally cracked at a temperature of 350° for six hours under a pressure of 1.7 mm. of mercury. A resin was thus obtained in 98% yield. It had a molecular weight of 39,000, a melting range of 104–111°, a hardness of 2.7 and softening point of 114°.

Example 3

Polybutene, 419 g., having a molecular weight of 350,000 and an isotactic content of 100% was thermally cracked at a temperature of 350° for six hours under a pressure of 4 mm. of mercury. A resin was thus obtained in 94% yield. It had a molecular weight of 13,500, a melting temperaure of about 117°, a softening point of 113°, and a hardness of 1.5.

Example 4

Polybutene, 300 g., having a molecular weight of 415,000 and an isotactic content of 94% was thermally cracked at a temperature of 350° for 2¾ hours under a pressure of 2.5 to 3.2 mm. A resin was obtained in 89% yield. It had a molecular weight of 32,000, a melting point of 114–115°, a softening point of 108° and a hardness of 0.0.

Example 5

Polybutene, 300 g., having a molecular weight of 415,000 and an isotactic content of about 94% was thermally cracked at a temperature of 350°, under a pressure of 3 to 8 mm. of mercury for two hours. The resultant amber colored product in 97% yield had a molecular weight of 44,300, a melting range of from 117° to 120°, a softening point of 138° and a hardness of 0.0. This amber colored product (284 g.) was dissolved in 3500 ml of heptane containing 2.8 g. of 2,2′ methylene bis (4-methyl-6 tertiary butyl phenol) antioxident (Catalin CAO-5) under nitrogen atmosphere at 98°. The hot solution was filtered and the filtrate concentrated and cooled to yield 273 g. of snow-white polybutene having a molecular weight of 44,600, and the same melting ranges, sofening point and hardness as the amber colored product is subjected to crystallization.

Example 6

Polybutene, 150 g., having a molecular weight of 477,000 and an isotactic content of about 92% was heated to 250° under a pressure of 3 mm. of mercury of 3¼ hours. The temperature was then raised to 275° for an additional 18¾ hours. On cooling, the product was obtained in 95% yield. It had a molecular weight of 40,000, a melting range of 115–118°, a softening point of 117° and a hardness of 2.5.

The resins herein disclosed are useful in the formation of floor polishes, imparting to floor polishes increased toughness and durability along with natural slip-resistance. They are compatible with paraffin waxes. The incorporation of blends of paraffin waxes and these resins improves the adhesive properties and tensile strength of coatings containing such blends. Moreover, such blends provide high gloss coatings that are grease and moisture resistant and will not crack or flake at low temperature. These characteristics render these resins particularly useful in the production of coated wrappers and containers for frozen foods. The resins are useful in textile finishes to improve the hand and drape of resin treated wash and wear fabrics. They are also useful in the production of coatings of paper which can be applied by hot-melt roll coating techniques at reasonable temperatures, say about 110° to 130°.

The above, it will be understood, represents some of the many applications of these resins.

Since certain changes in carrying out the process of thermally cracking polybutenes embodying this invention can be made without departing from the scope of this invention, it is intended that all matter contained in this description shall be interpreted as illustrative and not in a limiting sense.

What is claimed is:

1. The process of producing a synthetic hydrocarbon resin which comprises thermally cracking a polybutene-1 resin having a molecular weight of at least 50,000 and an isotactic content of a least 10% by weight by introducing said polybutent-1 resin into a thermal cracking zone maintained at a temperature of from 250° to 450° C. under a pressure of from 0.001 to 25 mm. of mercury and under non-oxidizing conditions, and maintaining said polybutene-1 resin in said zone until the molecular weight of the resultant synthetic hydrocarbon is within the range of from 3,000 to 45,000, and thereafter recovering the synthetic hydrocarbon resin from the thermal cracking zone.

2. The process of producing a synthetic hydrocarbon resin which comprises introducing a polybutene-1 resin consisting substantially entirely of isotactic material having a molecular weight in excess of 50,000 into a thermal cracking zone maintained at a temperature of from 250° to 450° C. under a pressure of from 0.01 to 25 mm. of mercury and under non-oxidizing conditions, maintaining the polybutene-1 resin in said thermal cracking zone until the molecular weight of the resultant synthetic hydrocarbon resin is within the range of from 3,000 to 45,000 and its hardness is between 0.0 and 3.0, and thereafter recovering the synthetic hydrocarbon resin from the thermal cracking zone.

3. The process defined in claim 1 in, which the synthetic hydrocarbon resin produced by heating the polybutene is extracted with a diethyl ether to remove the atactic material and produce as residue a resin having a molecular weight of from 3,000 to 45,000, a hardness between 0.0 and 3.0, a softening point between 100°–140° C., and a melting point between 105°–130° C.

4. The process of producing a synthetic hydrocarbon resin which comprises extracting a polybutene-1 having a molecular weight in excess of 50,000 and an isotactic content in excess of 10% with a solvent for the atactic material to produce a polybutane-1 having an isotactic content of at least 80% by weight, and thermally cracking the resultant polybutane-1 at a temperature of from 250° to 450° C., under a pressure of from 0.001 to 25 mm. of mercury in a non-oxidizing atmosphere to produce a polybutene-1 resin having a molecular weight of from 3,000 to 45,000 and a hardness between 0.0 and 3.0.

5. The continuous process of producing a synthetic hydrocarbon resin which comprises continuously introducing a stream of molten polybutene-1 having a molecular weight in excess of 50,000 and an isotactic content of at least 10% by weight into a reaction zone maintained under an inert atmosphere, a vacuum of from 0.001 to 25 mm. of mercury, and a temperature within the range of from 250° to 450° C., and continuously withdrawing from the reaction zone a resin product having the properties set forth in claim 1.

References Cited by the Examiner

FOREIGN PATENTS 817,135 7/59 Great Britain.
841,898 7/60 Great Britain.

JOSEPH L. SCHOFER, *Primary Examiner.*

UNITED STATES PATENT OFFICE
CERTIFICATE OF CORRECTION

Patent No. 3,198,779                            August 3, 1965

Raymond J. Kray et al.

It is hereby certified that error appears in the above numbered patent requiring correction and that the said Letters Patent should read as corrected below.

Column 1, line 67, for "Nagle" read -- Nalge --; column 3, line 67, for "are" read -- were --; column 4, line 69, for "sofening" read -- softening --; line 70, for "product is subjected" read -- product subjected --; column 5, line 1, for "of 3 1/4" read -- for 3 1/4 --; line 21, for "coatings of paper" read -- coatings for paper --; line 37, for "polybutent-1" read -- polybutene-1 --; column 6, lines 23 and 25, for "polybutane-1", each occurrence, read -- polybutene-1 --.

Signed and sealed this 22nd day of February 1966.

(SEAL)
Attest:

ERNEST W. SWIDER
Attesting Officer

EDWARD J. BRENNER
Commissioner of Patents